US007903610B2

(12) United States Patent
Cheng et al.

(10) Patent No.: US 7,903,610 B2
(45) Date of Patent: Mar. 8, 2011

(54) REVERSE LINK HANDOFF MECHANISM WITH HYBRID ARQ AND CELL SITE SELECTION

(75) Inventors: Mark W Cheng, San Diego, CA (US); Liangchi (Alan) Hsu, San Diego, CA (US)

(73) Assignee: Nokia Corporation, Espoo (FI)

( * ) Notice: Subject to any disclaimer, the term of this patent is extended or adjusted under 35 U.S.C. 154(b) by 1024 days.

(21) Appl. No.: 10/296,976

(22) PCT Filed: Apr. 2, 2002

(86) PCT No.: PCT/IB02/01033
§ 371 (c)(1),
(2), (4) Date: May 14, 2003

(87) PCT Pub. No.: WO02/082108
PCT Pub. Date: Oct. 17, 2002

(65) Prior Publication Data
US 2003/0224774 A1   Dec. 4, 2003

(51) Int. Cl.
*H04W 4/00* (2009.01)
(52) U.S. Cl. .............. 370/331; 370/335; 370/336; 455/442; 455/443; 455/437; 455/438; 714/748
(58) Field of Classification Search .......... 370/310, 370/328, 329–337, 320, 322, 342, 348; 455/436–444; 714/748–749
See application file for complete search history.

(56) References Cited

U.S. PATENT DOCUMENTS

| | | | |
|---|---|---|---|
| 4,608,711 A * | 8/1986 | Goldman ............... 455/436 |
| 4,751,725 A * | 6/1988 | Bonta et al. ............ 455/438 |
| 5,101,501 A * | 3/1992 | Gilhousen et al. ........ 455/442 |
| 5,241,685 A * | 8/1993 | Bodin et al. ............ 455/436 |
| 5,469,471 A | 11/1995 | Wheatley, III |
| 5,511,067 A | 4/1996 | Miller |
| 5,594,718 A * | 1/1997 | Weaver et al. ........... 370/331 |
| 5,621,723 A | 4/1997 | Walton, Jr. et al. |
| 5,697,055 A * | 12/1997 | Gilhousen et al. ........ 455/436 |
| 5,784,695 A * | 7/1998 | Upton et al. ............ 455/442 |
| 5,903,840 A * | 5/1999 | Bertacchi ............... 455/436 |
| 5,999,816 A * | 12/1999 | Tiedemann et al. ....... 455/437 |
| 6,021,123 A * | 2/2000 | Mimura ................. 370/331 |
| 6,021,328 A * | 2/2000 | Curtis et al. ............ 455/436 |
| 6,069,883 A | 5/2000 | Ejzak et al. |
| 6,070,086 A | 5/2000 | Dobrica |
| 6,075,989 A * | 6/2000 | Moore et al. ............ 455/436 |
| 6,091,717 A * | 7/2000 | Honkasalo et al. ........ 370/329 |
| 6,097,954 A * | 8/2000 | Kumar et al. ........... 455/442 |

(Continued)

*Primary Examiner* — Kwang B Yao
*Assistant Examiner* — Jeffrey M Rutkowski
(74) *Attorney, Agent, or Firm* — Alston & Bird LLP (57) ABSTRACT

A method for providing a reverse link handoff mechanism includes, with respect to communication between a mobile station and a first cell, initiating a start of a cell switch delay by transmitting a request that a new data channel be established with a second cell. The method further includes communicating with the first cell during the cell switch delay and upon an end of the cell switch delay, switching data transmission to the second cell. The cell switch delay is a time interval extending from a time that the request is transmitted until startig of reception of data packets via the new data channel by the second cell. The application of the cell switch delay is determined based on a location of the first cell and the second cell.

33 Claims, 4 Drawing Sheets

U.S. PATENT DOCUMENTS

| | | |
|---|---|---|
| 6,141,332 A | 10/2000 | Lavean |
| 6,178,194 B1 | 1/2001 | Vasic |
| 6,449,481 B1 * | 9/2002 | Kwon et al. ................. 455/437 |
| 6,678,523 B1 * | 1/2004 | Ghosh et al. ................ 455/442 |
| 6,801,512 B1 * | 10/2004 | Cudak et al. ................ 370/332 |
| 6,944,452 B2 * | 9/2005 | Coskun et al. .............. 455/436 |
| 6,985,463 B1 * | 1/2006 | Wright et al. ............... 370/331 |
| 7,006,828 B1 * | 2/2006 | Czaja et al. ................. 455/442 |
| 2002/0034947 A1 * | 3/2002 | Soliman ...................... 455/436 |
| 2002/0067706 A1 * | 6/2002 | Bautz et al. ................. 370/331 |
| 2002/0082019 A1 * | 6/2002 | Sunay et al. ................ 455/442 |
| 2002/0107026 A1 * | 8/2002 | Agrawal et al. ............. 455/453 |
| 2003/0060201 A1 * | 3/2003 | Soliman ...................... 455/442 |
| 2005/0135320 A1 * | 6/2005 | Tiedemann et al. ......... 370/338 |

* cited by examiner

REVERSE LINK HANDOFF MECHANISM WITH HYBRID ARQ AND CELL SITE SELECTION

TECHNICAL FIELD

The invention relates to making of handoffs on reverse link wireless high-speed packet data transmissions, such as in CDMA2000 1xEV-DV and 3GPP HSDPA, between a mobile station and a group of cells.

BACKGROUND ART

Hybrid automatic repeat request (H-ARQ) and cell selection are linking techniques employed by 1xEV-DV forward link services on the shared Forward Packet Data channel (FPDCH) between cells and mobile stations (MS). Cells comprise base transceiver stations (BTS) in wireless environments which have lower traffic and sectors, which subtend an angular portion of a full periphery such as 120°, having applications in wireless environments which have higher traffic.

For a reverse link soft handoff from one cell to another cell, in a CDMA system, the communication path is maintained during cell switching, without disrupting the original communication path (make before break transfer). Reverse link soft handoff has problems with redundant channel elements and Abis interface (the interface overhead between the base station controller (BSC) and the cells) which significantly affects cell performance.

H-ARQ has been applied to the Supplemental Channel on the reverse link to improve throughput. H-ARQ uses multiple instances of an acknowledgment-based stop-and-wait ARQ protocol for code combining.

Cell selection is a handoff technique that allows the MS to identify an optimal cell (base station to base station, base station to sector or sector to sector) based on a mobile assisted handoff technique (MAHO) measurement. The MS uses the carrier signal strength to interference ratio (C/I) measurements to select the best cell for forward link transmission and indicates to the members of the active set. See L. Jalloul, "Joint 1XTREME proposal for 1XEVDV", 3GPP2-C50-20001 204-006R1, Kauai Hi., December 2000 with further details being set forth in Faisal Shad, "1XTREME Uplink Hybrid ARQ Procedures", 1XTREME MAC Ad-Hoc, March 2000.

DISCLOSURE OF THE INVENTION

The present invention is a process and system for the transmission of data packets on a reverse link between a mobile station and a group of selectable cells (base stations or sectors). A request to make a handoff from a first cell to a second cell within a group of selectable cells is transmitted from the mobile station to the active set. During a cell switching delay, occurring between the request and the beginning of reception of data packets from the second cell, data packet retransmissions and acknowledgement are sent between the first cell and the mobile station. After handoff is complete, data packets are transmitted from the mobile station to the second cell.

The present invention uses cell selection to replace reverse link soft handoff. With the H-ARQ improvement, soft handoff on the reverse link wastes air resources especially when the reverse data rate is much higher for 1xEV-DV (around 614 kbps). In addition to 1xEV-DV's quick resumption of data transfer, the invention's use of H-ARQ and cell selection in the reverse link provides the benefits of reducing channel element usage and the Abis interface overhead in comparison with the traditional soft-handoff.

The invention may be without limitation implemented in the BTSs and MSs of CDMA2000 1xEV-DV.

The invention provides data users with better air and network resources utilization in BTSs, such as with 1xEV-DV.

A process for the transmission of data packets on a reverse link between a mobile station and a set of cells in accordance with the invention includes establishing a data channel between the mobile station and a first cell with the data channel being used by the mobile station to transmit data packets to the first cell; transmitting from the mobile station a request to the active set of cells that a new data channel with a second cell should be established between the mobile station and the second cell with the new data channel to be used by the mobile station to transmit data packets to the second cell; sending any data packet retransmissions and data packet acknowledgements between the first cell and the mobile station during a cell switch delay, during which handoff occurs from the first cell to the second cell; and upon an end of the cell switch delay, data transmission by the mobile station is switched from the first cell to the second cell; and wherein the cell switch delay is a time interval from a time that the request to the second cell is made until starting of reception of data packets by the base station from the second cell; and the data channels between the mobile station and the cells are used only by the mobile station to t transmit data packets to the first and second cells. During a switchover between receptions of data packets from the first cell to the second cell only a forward control channel may be active between the first cell and the mobile station to transmit the data packet acknowledgements. The cell may comprise a base station or a sector. The cells may in accordance with IS-2000 and the data packets in the reverse link between the mobile station and die cells may be CDMA encoded in accordance with IS-2000. The acknowledgements may be in accordance with the hybrid automatic repeat request (H-ARQ) protocol. The acknowledgments may be transmitted on a forward link common channel on a forward link dedicated channel or on a forward link sub channel time multiplexed with at least one other forward link channel. Control information may be transmitted with the acknowledgments and may comprise congestion control or power control information. Data transmissions between the mobile station and the cells may use the physical layer automatic repeat request (ARQ) protocol. Selection of the cells by the mobile station may be in accordance with 3GPP or 3GPP2. Acknowledgments may be continuously sent from the mobile station to the first cell during the cell switch delay. If the second cell is not ready to receive the data packets after expiration of the cell switch delay, transmission of data packets from the mobile station to the first cell may be terminated. Additional delay time may be added to the cell switch delay time after the expiration of die cell switch delay time to complete the handoff to the second cell.

A system for transmission of data packets on a reverse link in accordance with the invention includes a mobile station; a group of selectable cells; and wherein a data channel is established between the mobile station and a first cell with the data channel being used by the mobile station to transmit data packets to the first cell; a request is transmitted from the mobile station to a active set of cells that a new data channel with a second cell should be established between the mobile station and a second cell with the new data channel to be used by the mobile station to transmit data packets to the second cell; any data packet retransmissions and data packet acknowledgements are sent between the first cell and the mobile station during a cell switch delay, during which handoff occurs, from the first cell to the second cell; upon an end of the cell switch delay, data transmission by the mobile station is switched from the first cell to the second cell; the cell switch delay is a time interval from a time that the request to the second cell is made until starting of reception of data packets by the base station from the second cell; and the data channels between the mobile station and the cells are used only by the mobile station to transmit data packets to the first and second cells. During a switchover between receptions of data packets from the first cell to the second cell only a forward control channel may be active between the first cell and the mobile station to transmit the data packet acknowledgements. The cell may comprise a base station or a sector. The cells may in accordance with IS-2000 and the data packets in the reverse link between the mobile station and the cells may be CDMA encoded in accordance with IS-2000. The acknowledgements may be in accordance with the hybrid automatic repeat request (H-ARQ) protocol. The acknowledgments may be transmitted on a forward link common channel on a forward link dedicated channel or on a forward link sub channel time multiplexed with at least one other forward link channel. Control information may be transmitted with the acknowledgments and may comprise congestion control or power control information. Data transmissions between the mobile station and the cells may use the physical layer automatic repeat request (ARQ) protocol. Selection of the cells by the mobile station may be in accordance with 3GPP or 3GPP2. Acknowledgments may be continuously sent from the mobile station to the first cell during the cell switch delay. If the second cell is not ready to receive the data packets after expiration of the cell switch delay, transmission of data packets from the mobile station to the first cell may be terminated. Additional delay time may be added to the cell switch delay time after the expiration of the cell switch delay time to complete the handoff to the second cell.

BEST MODE FOR CARRYING OUT THE INVENTION

Figure 1:
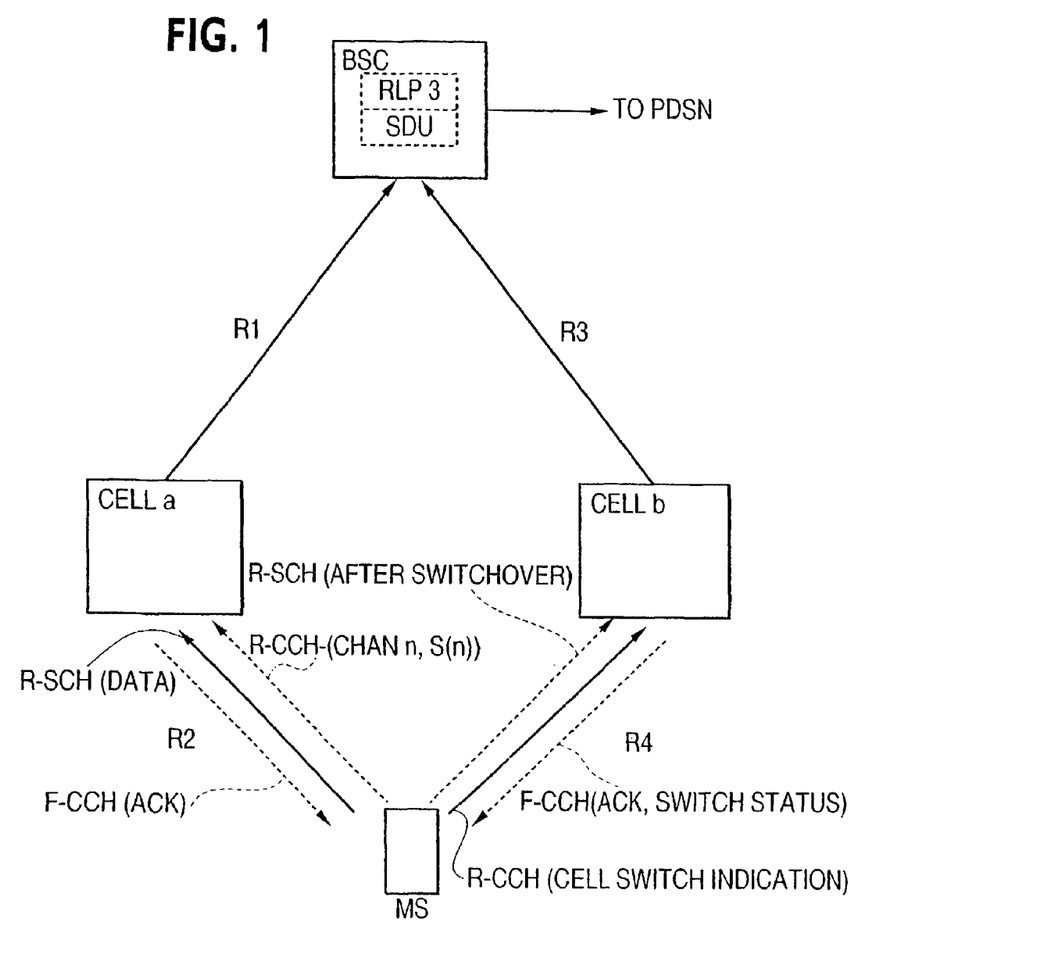
FIG. 1 illustrates an example of a cell handoff in accordance with the present invention.

FIG. 1 shows an example of cell switching between cells a and b by the MS within an active set of cells. Cells are in accordance with their description above. The base station controller (BSC) uses a radio link protocol, such as the indicated RLP3 and contains a selection and distribution unit SDU. The BSC is connected to a packet data serving node PDSN. Cell a (the first cell) receives and decodes Supplemental Channel data packets sent from the MS. Switching occurs between cell a and cell b (the second cell) as illustrated. In certain circumstances, the MS decides to request a new cell selection by sending a request on the reverse Channel Quality Indicator channel (R-CQICH) that connectivity to a new cell is desired to be obtained. After the MS requests a new cell selection to cell b chosen from within the active set, the data packets are received and decoded by cell b after a cell switch delay (CSD). The CSD is required for the cell b to allocate network and radio resources R3 and R4 and to complete the data packet retransmission and acknowledgement via cell a's F-CCH (Forward Control Channel) & R-SCH (Reverse Link Supplemental Channel). The CSD is defined as the time duration between the time the MS indicates by a cell switch indication that a cell switch is to occur and the time when the reverse link data reception is ready for receiving data packets from the selected cell b. If cell b is not ready after die expiration of the CSD due to the signaling delay or time latency, additional handoff delay time may be added to the cell switch delay time after the expiration of the cell switch delay time to complete the handoff to the second cell. However, in this circumstance, the data transmission between cell a and the mobile station is dropped after expiration of the CSD.

All cells of the active set are selectable for preferred cell site connection. The active set is for the forward fundamental channel or dedicated control channel updated by the cells based on the pilot strength feedback from the MS. The invention uses a cell selection method on the reverse link supplemental Channel (R-SCH) which is similar to the cell selection on the forward packet data channel. The invention limits the supplemental channel data reception/decoding in the reverse link to only one cell at a time instead of all active set members, which are used during the soft handoff.

Figure 2:
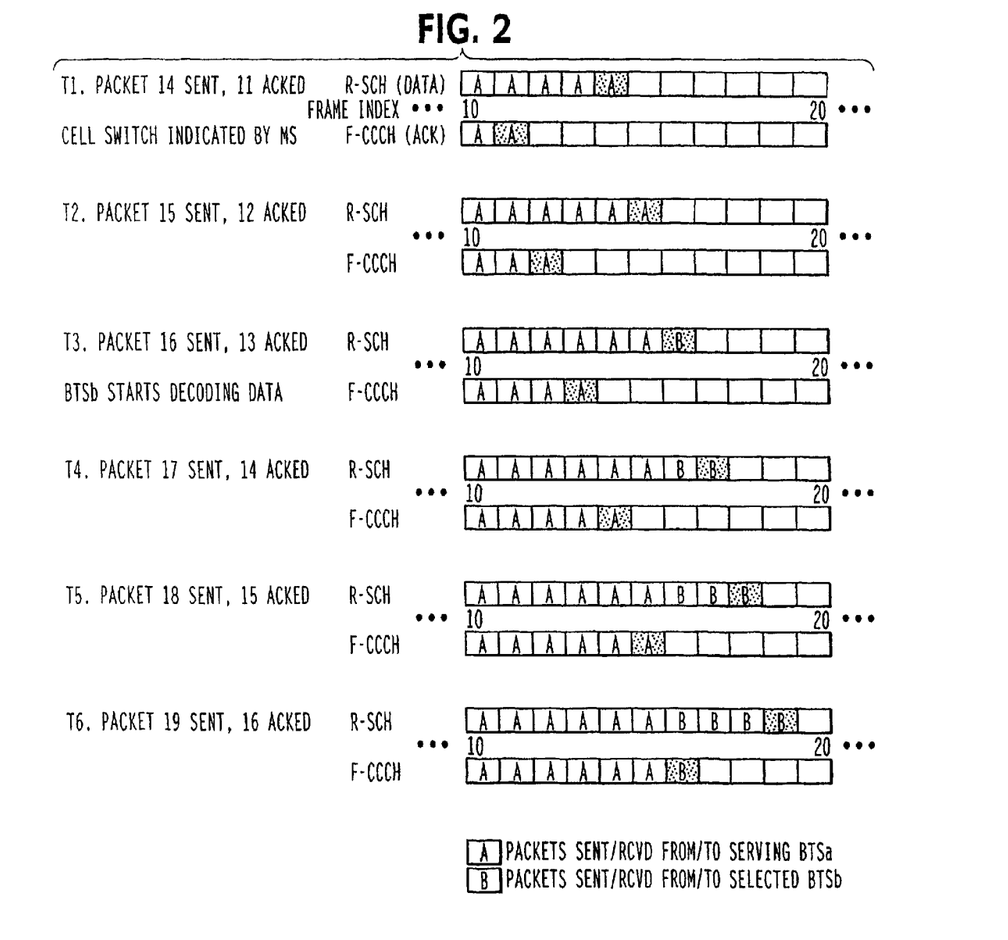
FIG. 2 illustrates an example of reverse link cell selection in accordance with the present invention.

FIG. 2 illustrates reverse link cell selection in accordance with the present invention. The H-ARQ protocol is also used as part of the data transmission methodology and uses a combination of error correction techniques in data packets and retransmission of data packets. Packets sent or received by the Reverse Supplemental Channel (R-SCH) and forward control channel (F-CCH) are shown in each transmission interval from T1 to T6. Without loss of generality, it is assumed that the reception of data packets is switched from cell a to cell b and the data and control channels are both error free. In case of errors, the MS and the currently active cell handle the retransmission.

The serving cell (first cell) a is the cell that serves the MS before the cell switching. The selected cell (second cell) b is defined as the cell chosen for the transmission after the cell switching. The delay between the data transmission and the acknowledgment (ACK) is by example the transmission time intervals. CSD is set at two transmission frames. The time length of the CSD depends on the location of the serving base station or serving sector and the location of the selected base station or the selected sector including location thereof in different cells.

The cell switch is determined by the MS and the indication is bundled inside the "Reverse Control channel" SDU. For 1xEV-DV applications of the invention, the channel is mapped to the "Reverse Quality Indicator channel (R-QIECH). The forward control channel (F-CCH) sends the data packet acknowledgment ACK and possibly switchover status.

The procedure in FIG. 2 highlights the transition of packet transmissions and acknowledgments (ACKS) during the cell switching. There are three phases during the transition from cell a to cell b:

Phase 1—Pre-switching period: Time duration T1 and T2 are in this phase.

Phase 2—In-switching period: Time duration T3 to T5 are in this phase.

Phase 3—Post-switching period: Time duration T6 and beyond are in this phase.

Figure 3:
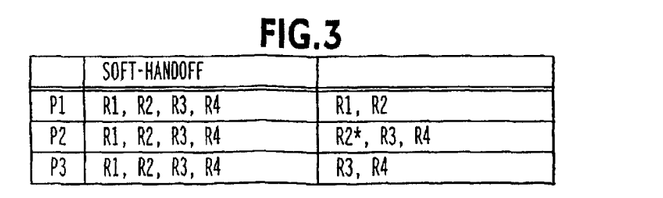
FIG. 3 illustrates a comparison of radio resources used by the prior art soft-handoff versus the use of radio resources by the present invention.

Radio resources required during each phase are illustrated in FIG. 3. R1, R3, R2 and R4 are Abis and channel element resources identified in FIG. 1.

The advantages of cell selection over soft-handoff is two-fold: cell resource efficiency and MS complexity reduction.

The MS also does not need to decode all Forward Control Channels (F-CCH) from all cells in the active set. The MS only decodes one F-CCH from the serving cell. During the cell switching period, the MS decodes at most two cells, one serving, e.g. cell a, and one selected, e.g. cell b of FIG. 1.

The following discussion describes the procedures for both the MS and BTS to fulfill reverse link H-ARQ & cell selection.

Radio Link Cell Site Selection/H-ARQ MS Procedures

Figure 4:
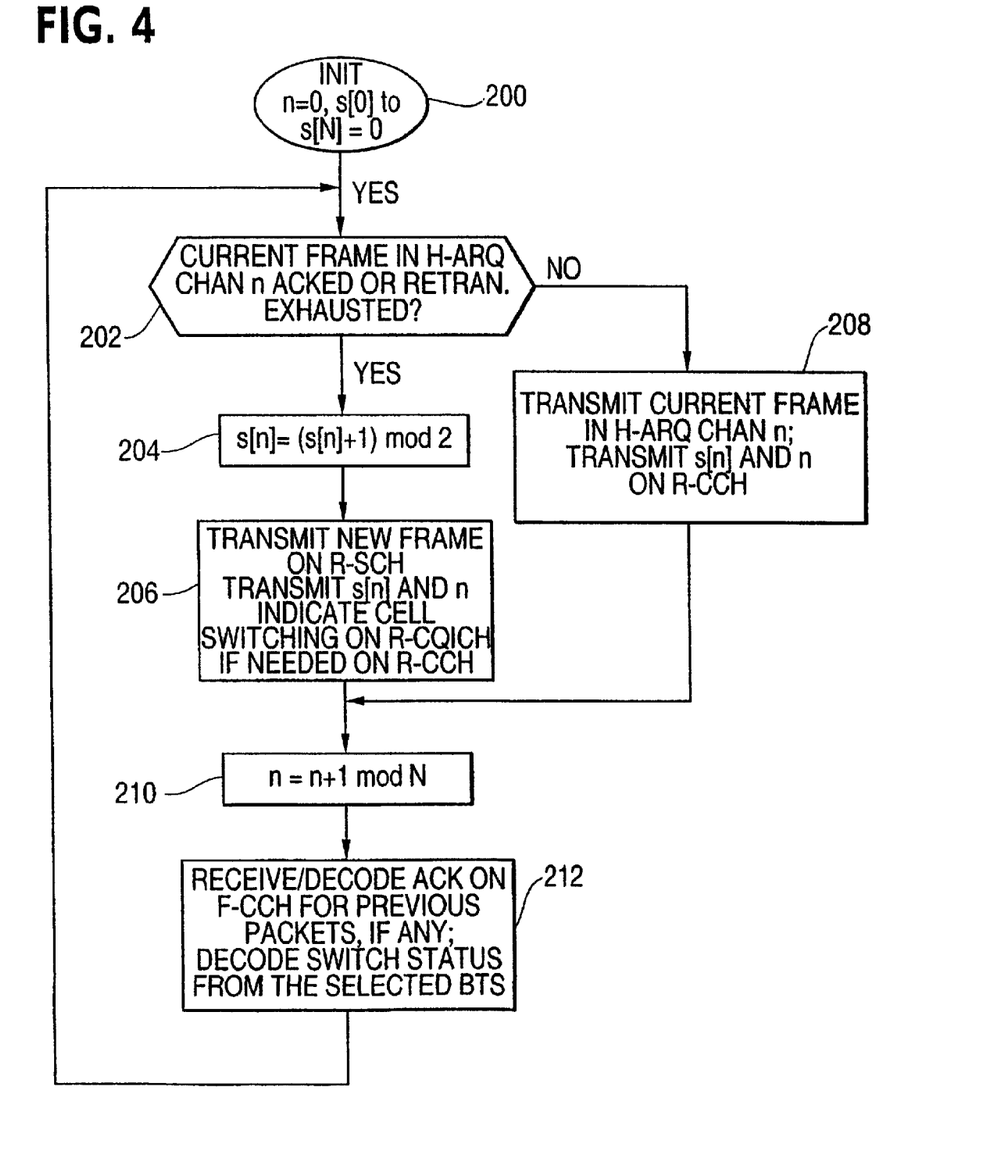
FIG. 4 illustrates MS procedures used by the present invention.

The MS defines the following data structures and runs the procedures of FIG. 4 for every transmission time interval (TTI) of ms. as long as there are packets to transmit:
N=number of H-ARQ channels,
k=delay measured in units of TTI ms. between transmission of a H-ARQ channel on the reverse link and the associated ACK on the forward link,
n=current H-ARQ channel being processed (initialized to 0) and,
int s[N]=one-bit H-ARQ channel sequence number (initialized to '0').

The procedures of FIG. 4 start at the initial point 200 where initialization of parameters n and s set to zero occurs. At point 202, if an ACK='1' has been received from the previous transmission into H-ARQ channel n, or if the maximum number of retransmissions has been exhausted, incrementing of the H-ARQ channel sequence number s(n) mod 2 occurs at point 204 and processing proceeds to point 206. At point 206 transmission of the encoded and modulated frame at the selected modulation and coding (MSC) level occurs. If the reverse link should be transferred to the new selected cell b, the switching status indicated on the Reverse Channel Quality Indicator channel (R-CQICH) for the selected cell b also occurs. Transmission of the current H-ARQ channel n and H-ARQ channel sequence number s(n) on the R-CCH occurs as indicated at point 206. Otherwise, retransmission of the buffered frame associated with the current H-ARQ channel n occurs at point 208. The current H-ARQ channel n and H-ARQ channel sequence number s(n) are transmitted on the Reverse Control Channel in parallel (R-CCH) with the R-SCH as indicated at point 208. At point 210 incrementing of the H-ARQ channel n=n+1 mod N occurs. At point 212 decoding of the ACK sent on the forward control channel F-CCH from the selected cell b occurs. Decoding the F-CCH from the previous serving cell b during the CSD for the scheduled ACKs or NAKs also occurs at point 212. Processing back to step 202 occurs.

Radio Link Cell Site Selection/H-ARO CELL Procedures

Figure 5:
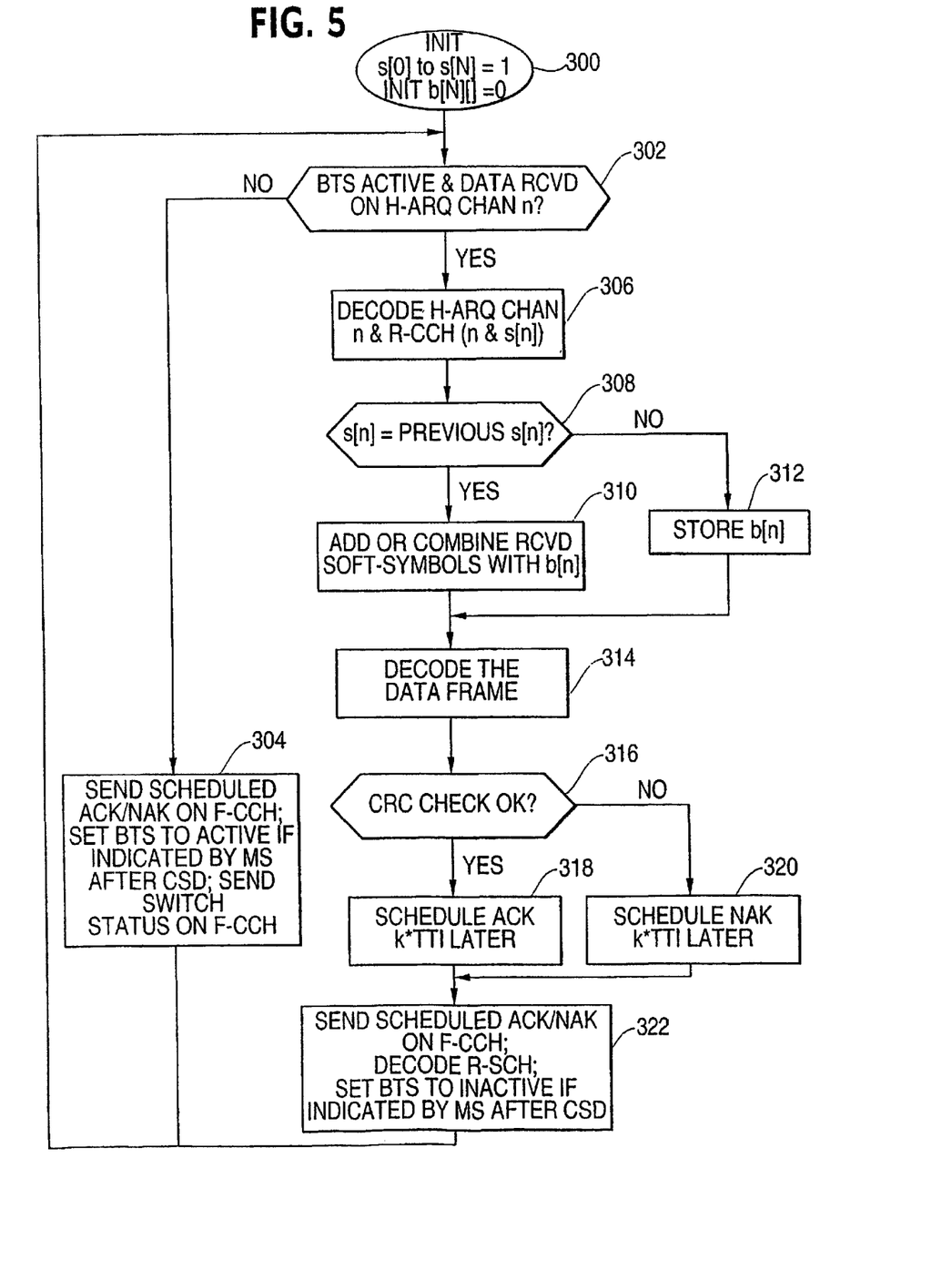
FIG. 5 illustrates BS procedures used by the present invention.

Each cell in the active set runs the steps of FIG. 5 every TTI ms. The following data structures are defined:
n=current H-ARQ channel, int s[N]=one-bit H-ARQ channel sequence number (initialized to '1'), and float b[N][Interleaver Size]=H-ARQ channel soft-symbol buffer (initialized to '0').

The procedures of FIG. 5 start at initial point 300 where S is set to 1 and b is set to zero. At point 302, if die cell is not active or no data is received on the H-ARQ channel, the processing proceeds to point 304. At point 304, decoding of the cell switch indication on the CQICH occurs: if the MS indicates a cell switch to this cell and the supplemental channel is granted, the cell is set to active after the cell switch delay; if the MS indicates a cell switch to another cell in the active set, the cell is set to inactive after the cell switching delay; and any scheduled ACK/NAK is transmitted on the F-CCH only before the cell switch delay. If the answer is "yes" at point 302, decoding of the H-ARQ channel n and the associated sequence number s(n) received on the Reverse Control Channel (R-CCH) occurs at point 306. If the H-ARQ channel sequence number s(n) is the same as the previous transmission at point 308, adding the received soft-symbols with the soft-symbols stored in b(n) occurs at point 310.

If the answer is "no" at point 308, processing proceeds to point 312 where the new soft-symbols are stored into b(n). At point 314, decoding of the data frame occurs. If the CRC check is determined to be OK at point 316, passing the decoded frame up to the SDU and scheduling of ACK='1' on the Forward Control Channel (F-CCH) k*TTI ms frames later occurs at point 318. Otherwise, the decoded frame is discarded and scheduling of ACK='0' on the F-CCH k*TTI ms frames later occurs at point 320. Processing then proceeds to point 322 where sending a scheduled ACK/NACK on F-CCH occurs; R-SCH is decoded; and the BTS is set to inactive if indicated by the MS after CDS. Processing returns to point 302 from either of points 304 or 322.

A cell is considered active for a MS when the cell has acquired the Reverse supplemental Channel assigned to the MS and is decoding the data received from the Supplemental Channel.

The process of the present invention utilizes cell selection methodology for reverse link high-speed packet data. The invention is, without limitation, applicable to the 3GPP and 3GPP2 standards.

The acknowledgments are preferably in accordance with the hybrid automatic request (H-ARQ) protocol. Transmission of the acknowledgments may be on diverse channels, including a forward link common channel, a forward link dedicated channel, or a forward link set channel time-multiplexed with another forward link channel. The acknowledgement channel can also carry other control information including congestion or power control information.

While the invention has been described in terms of its preferred embodiments, it should be understood that numerous modifications may be made thereto without departing form the scope of the invention. It is intended that all such modifications fall within the scope of the appended claims.

What is claimed is:

1. A process comprising:
communicating with a first cell via a data channel between a mobile station and the first cell with the data channel being used by the mobile station to transmit data packets to the first cell;
initiating a start of a cell switch delay by transmitting from the mobile station a request to the first cell that a new data channel with a second cell should be established between the mobile station and the second cell with the new data channel to be used by the mobile station to transmit data packets to the second cell;
communicating, via the data channel, with the first cell during the cell switch delay, the communication via the data channel occurring between only the first cell and the mobile station during the cell switch delay after which handoff occurs from the first cell to the second cell; and
upon an end of the cell switch delay, data transmission by the mobile station is switched from the first cell to the second cell; and wherein
the cell switch delay is a time interval extending from a time that the request is transmitted until starting of reception of data packets via the new data channel by the second cell, the application of the cell switch delay being determined based on a location of the first cell and the second cell; and the data channels between the mobile station and the first and second cells are used by the mobile station to transmit data packets to the first and second cells.

2. A process in accordance with claim 1 wherein:
during a switchover between receptions of data packets from the first cell to the second cell only a forward control channel is active between the first cell and the mobile station to transmit the data packet acknowledgements.

3. A process in accordance with claim 1 wherein:
at least one of the first cell or the second cell comprises a base station.

4. A process in accordance with claim 1 wherein:
at least one of the first cell or the second cell comprises a sector.

5. A process in accordance with claim 1 wherein:
at least one of the first cell or second cells are in accordance with IS-2000 (interim standard-2000) and the data packets in the reverse link between the mobile station and at least one of the first cell or second cells are CDMA (code division multiple access) encoded in accordance with IS-2000.

6. A process in accordance with claim 1 wherein:
the data packet acknowledgements are in accordance with the hybrid automatic repeat request (H-ARQ) protocol.

7. A process in accordance with claim 6 wherein:
the data packet acknowledgments are transmitted on a forward link common channel.

8. A process in accordance with claim 6 wherein:
the data packet acknowledgments are transmitted on a forward link dedicated channel.

9. A process in accordance with claim 6 wherein:
the data packet acknowledgments are transmitted on a forward link sub channel time multiplexed with at least one other forward link channel.

10. A process in accordance with claim 1 wherein:
data transmissions between the mobile station and at least one of the first cell or second cells use the physical layer automatic repeat request (ARQ) protocol.

11. A process in accordance with claim 1 wherein:
selection of at least one of the first cell or second cells by the mobile station is in accordance with 3GPP (Third Generation Partnership Project).

12. A process in accordance with claim 1 wherein:
selection of at least one of the first cell or second cells by the mobile station is in accordance with 3GPP2 (Third Generation Partnership Project 2).

13. A process in accordance with claim 1 wherein:
data packet acknowledgments are continuously sent from the first cell to the mobile station during the cell switch delay.

14. A process in accordance with claim 1 wherein:
control information is transmitted with the data packet acknowledgments.

15. A process in accordance with claim 14 wherein:
the control information comprises congestion control or power control information.

16. A process in accordance with claim 1 wherein:
if the second cell is not ready to receive the data packets after expiration of the cell switch delay, transmission of data packets from the mobile station to the first cell is terminated.

17. A process in accordance with claim 1 wherein:
if the second cell is not ready to receive the data packets after expiration of the cell switch delay, additional delay time is added to the cell switch delay after the expiration of the cell switch delay to complete the handoff to the second cell.

18. An apparatus comprising a processor and a memory including computer program code, the memory and the computer program code configured to, with the processor, cause the apparatus to at least:
communicate with a first cell via a data channel between a mobile station and the first cell with the data channel being used by the mobile station to transmit data packets to the first cell;
initiate a start of a cell switch delay by transmitting from the mobile station a request to the first cell that a new data channel with a second cell should be established between the mobile station and the second cell with the new data channel to be used by the mobile station to transmit data packets to the second cell;
communicate, via the data channel, with the first cell during the cell switch delay, the communication via the data channel occurring between only the first cell and the mobile station during the cell switch delay after which handoff occurs from the first cell to the second cell; and
switch, upon an end of the cell switch delay, data transmission by the mobile station from the first cell to the second cell; and wherein
the cell switch delay is a time interval extending from a time that the request is transmitted until starting of reception of data packets via the new data channel by the second cell, the application of the cell switch delay being determined based on a location of the first cell and the second cell; and
the data channels between the mobile station and the first and second cells are used by the mobile station to transmit data packets to the first and second cells.

19. The apparatus of claim 18, wherein:
during a switchover between receptions of data packets from the first cell to the second cell only a forward control channel is active between the first cell and the mobile station to transmit the data packet acknowledgements.

20. The apparatus of claim 18, wherein:
at least one of the first cell or second cells are in accordance with IS-2000 (interim standard-2000) and the data packets in the reverse link between the mobile station and the cells are CDMA (code division multiple access) encoded in accordance with IS-2000.

21. The apparatus of claim 18, wherein:
the data packet acknowledgements are in accordance with the hybrid automatic repeat request (H-ARQ) protocol.

22. The apparatus of claim 21, wherein:
the data packet acknowledgments are transmitted on a forward link common channel.

23. The apparatus of claim 21, wherein:
the data packet acknowledgments are transmitted on a forward link dedicated channel.

24. The apparatus of claim 21, wherein:
the data packet acknowledgments are transmitted on a forward link sub channel time multiplexed with at least one other forward link channel.

25. The apparatus of claim 18, wherein:
data transmission between the mobile station and at least one of the first cell or second cells uses the physical layer automatic repeat request (ARQ) protocol.

26. The apparatus of claim 18, wherein:

selection of the cells by the mobile station is in accordance with 3GPP (Third Generation Partnership Project) or 3GPP2.

27. The apparatus of claim 18, wherein:

data packet acknowledgments are continuously sent from the first cell to the mobile station during the cell switch delay.

28. The apparatus of claim 18, wherein:

control information is transmitted with the data packet acknowledgments.

29. The apparatus of claim 28, wherein:

the control information comprises congestion control or power control information.

30. The apparatus of claim 18, wherein:

if the second cell is not ready to receive the data packets after expiration of the cell switch delay, transmission of data packets from the mobile station to the first cell is terminated.

31. The apparatus of claim 18, wherein:

if the second cell is not ready to receive the data packets after expiration of the cell switch delay, additional delay time is added to the cell switch delay after the expiration of the cell switch delay to complete the handoff to the second cell.

32. An apparatus comprising a processor and a memory including computer program code, the memory and the computer program code configured to, with the processor, cause the apparatus to at least:

establish a data channel between a mobile station and a first cell associated with the apparatus, the data channel being used by the mobile station to transmit data packets to the first cell;

receive a request from the mobile station requesting that a new data channel with a second cell be established between the mobile station and the second cell with the new data channel to be used by the mobile station to transmit data packets to the second cell, the request initiating a start of a cell switch delay; and communicate, via the data channel, with the mobile terminal during the cell switch delay, the communication occurring between only the first cell and the mobile station during the cell switch delay, after which handoff occurs, from the first cell to the second cell, the cell switch delay being a time interval from a time that the request is made until starting of reception of data packets via the new data channel by the second cell, the application of the cell switch delay being determined based on a location of the first cell and the second cell, wherein upon an end of the cell switch delay, data reception by the apparatus switches from the receiving transmissions from the first cell to receiving transmissions from the second cell.

33. The apparatus of claim 32, wherein:

during a switchover between receptions of data packets from the first cell to the second cell only a forward control channel is active between the first cell and the mobile station to transmit the data packet acknowledgements.

* * * * *

UNITED STATES PATENT AND TRADEMARK OFFICE
CERTIFICATE OF CORRECTION

| | |
|---|---|
| PATENT NO. | : 7,903,610 B2 |
| APPLICATION NO. | : 10/296976 |
| DATED | : March 8, 2011 |
| INVENTOR(S) | : Cheng et al. |

It is certified that error appears in the above-identified patent and that said Letters Patent is hereby corrected as shown below:

Column 2,

Line 34, "and die cells" should read --and the cells--;

Line 53, "of die cell" should read --and the cell--.

Column 4,

Line 11, "after die" should read --after the--;

Line 44, "example the" should read --example three--.

Column 5,

Line 61, "if die cell" should read --if the cell--.

Signed and Sealed this
Twenty-fifth Day of September, 2012

David J. Kappos
*Director of the United States Patent and Trademark Office*